United States Patent [19]

Veenis et al.

[11] Patent Number: 5,025,435
[45] Date of Patent: Jun. 18, 1991

[54] APPARATUS FOR READING OR WRITING CONTRAST ENHANCED INFORMATION OPTICAL RECORD CARRIER

[75] Inventors: Aartje W. Veenis; Winslow M. Mimnagh, both of Eindhoven, Netherlands

[73] Assignee: U. S. Philips Corporation, New York, N.Y.

[21] Appl. No.: 554,604

[22] Filed: Jul. 18, 1990

Related U.S. Application Data

[62] Division of Ser. No. 191,505, May 9, 1988, Pat. No. 4,949,332.

[51] Int. Cl.$^5$ .............................................. G11B 7/00
[52] U.S. Cl. ..................................................... 369/48
[58] Field of Search ..................... 369/48, 49, 54, 111, 369/124

[56] References Cited

FOREIGN PATENT DOCUMENTS 59-42653  9/1984  Japan ............................... 369/275.3

Primary Examiner—Donald McElheny, Jr.
Attorney, Agent, or Firm—David R. Treacy

[57] ABSTRACT

An inscribable record carrier (1) is described, which comprises a previously recorded servo-track structure provided with a recording layer. The contrast between the servo-tracks (3) provided with information areas and the intermediate tracks (5) is increased by combining wide tracks (20) with a white-writing recording layer (24) or by combining narrow servo-tracks (20) with a black-writing recording layer (21).

4 Claims, 4 Drawing Sheets

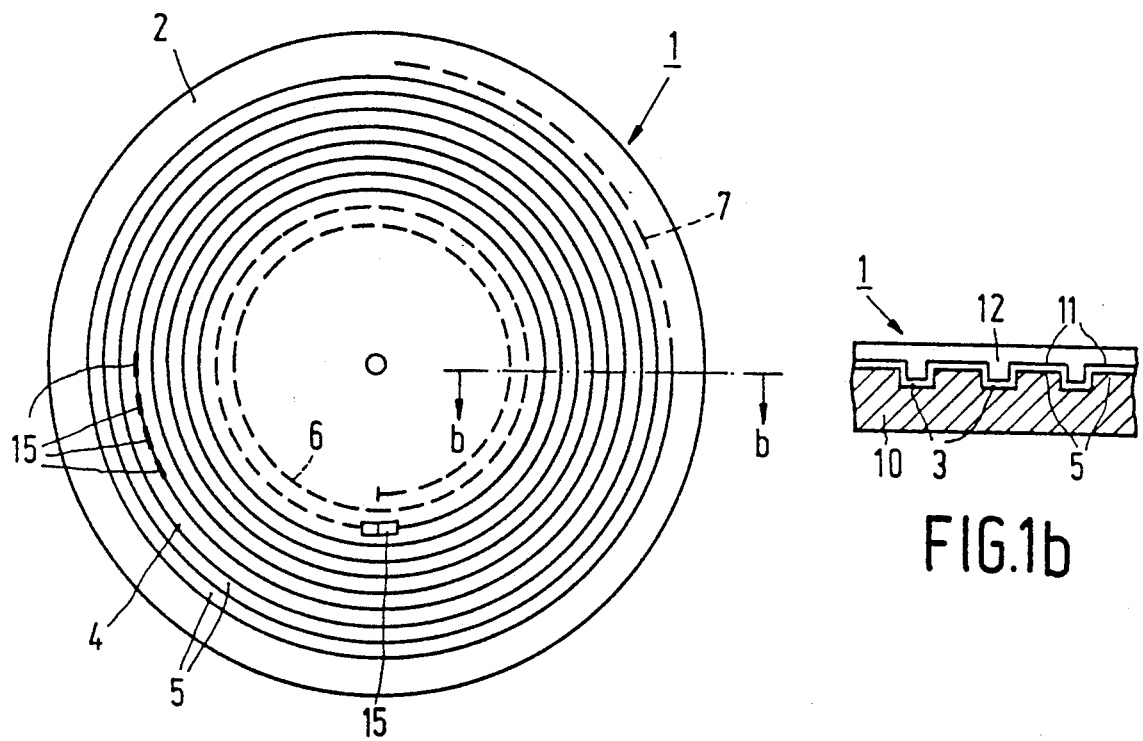
FIG.1a
FIG.1b
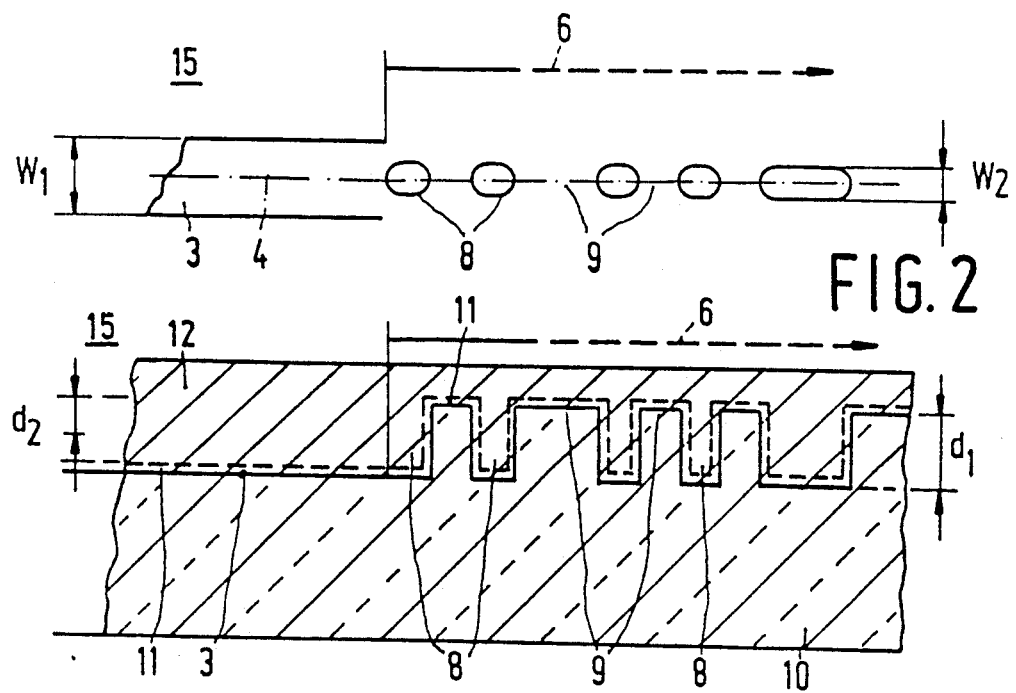
FIG.2
FIG.3

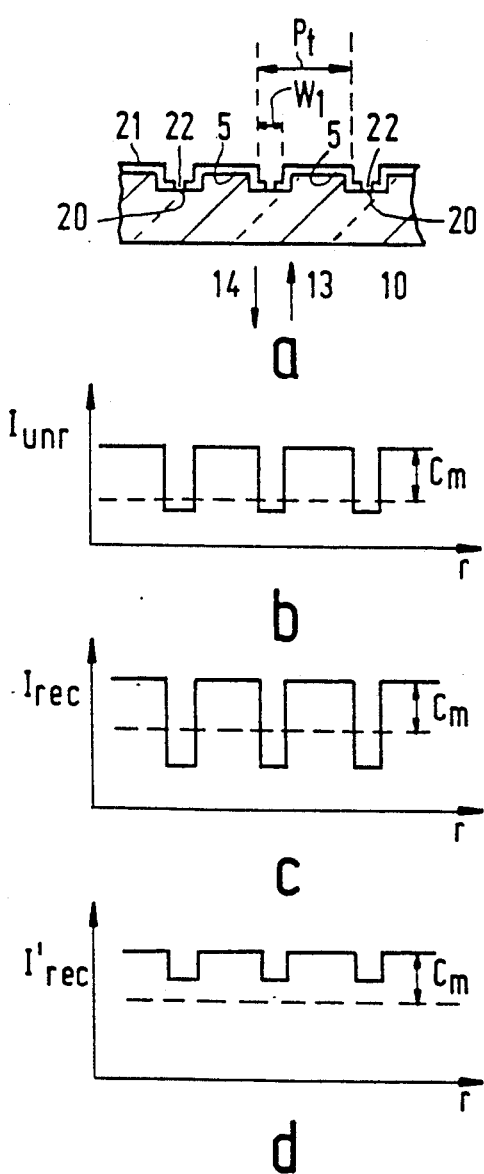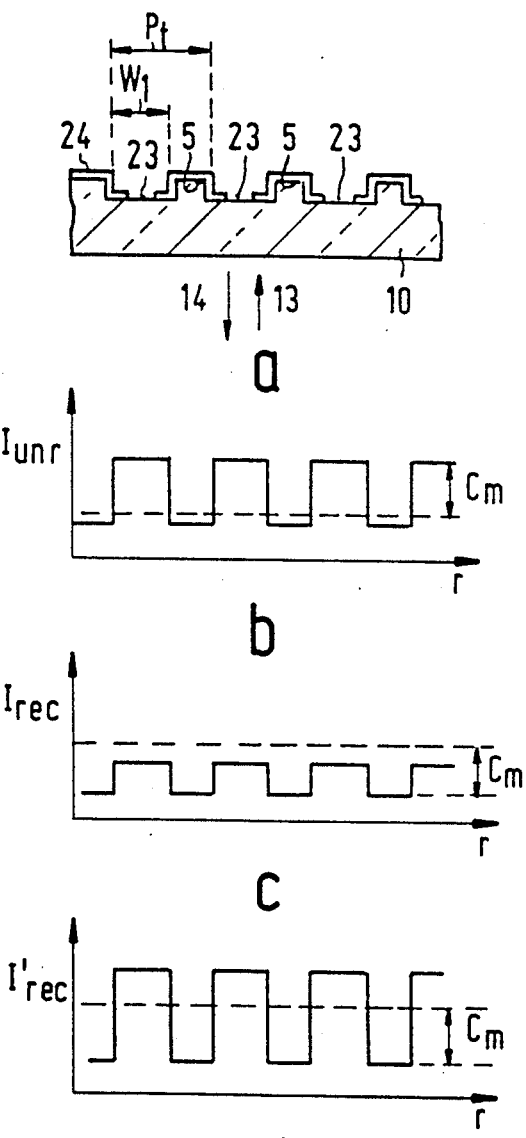

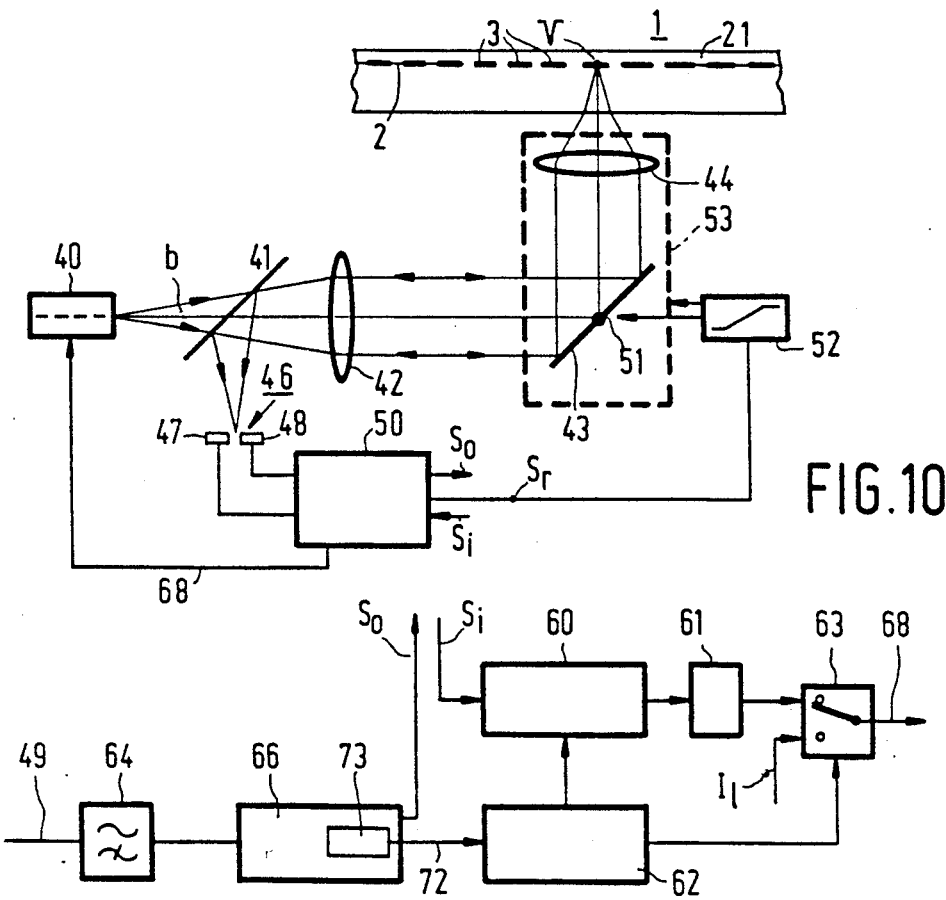
FIG.10
FIG.11
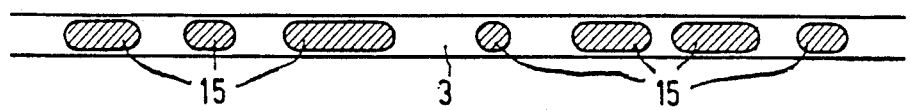
FIG.12
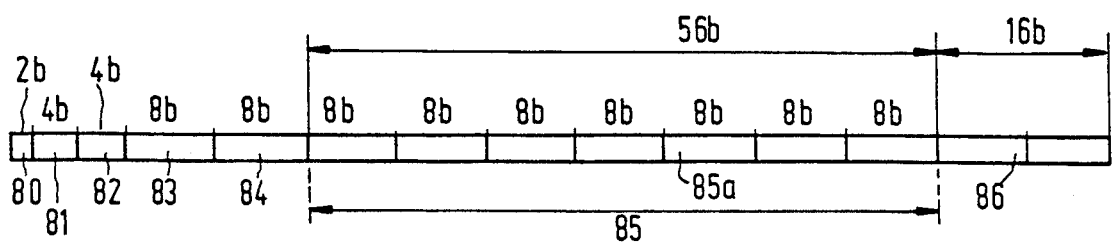
FIG.13

APPARATUS FOR READING OR WRITING CONTRAST ENHANCED INFORMATION OPTICAL RECORD CARRIER

This is a division of U.S. application Ser. No. 191,505, filed May 9, 1988.

The invention relates to an optical record carrier to be optically-provided with optically readable information, said record carrier comprising a substrate provided with an information surface having a structure of servo-tracks in which the information is to be recorded and which alternate in a transversal direction, i.e. transversely to the track direction, with intermediate lands located in the information plane, whilst the servo-tracks are located in a second plane, the servo-track structure having a given transversal track period and being provided with an inscribable recording layer for writing optically detectable information areas in the servo-tracks.

The invention also relates to an apparatus for reading and/or writing information in a pattern of optically detectable information areas in such a record carrier, said apparatus comprising scanning means for scanning a track by means of a radiation beam, opto-electrical conversion means for converting radiation from the track into an electric signal and a signal processing circuit for deriving from the electric signal an information signal representing the information recorded in the scanned track.

In the case of a round disc-shaped record carrier the servo-tracks may be concentric tracks, but preferably these tracks are quasi-concentric tracks which join one another to form a spiral track.

Optical record carriers are generally known nowadays, particularly on the consumer market, as audio disc, or compact disc ("CD") and as video disc, or Laservision disc. These record carriers, Which have been written by the manufacturer and can only be read by the consumer, can be manufactured in bulk quantities at low cost by using known pressing and replica technique starting from a so-called "master disc" in which the information is first written optically. In addition, there are record carriers in which a user can write information himself.

Such a record carrier described, for example, in German Patent Application DE-OS 3,100,421 laid open to public inspection has a servo-track structure and a recording layer provided thereon whose optical properties can be changed locally by a radiation beam focused to a small radiation spot. The inscribable record carriers, which in the first instance are intended for professional or semi-professional use, but which are also going to be used in the consumer field, can be manufactured by means of the same low-cost method as the written record carriers for consumer applications.

When the information is written, the servo-tracks are used to detect the position of the write-radiation spot with respect to the centre line of a scanned track and the tracking error signal obtained is used to correct this position. Consequently, the requirements imposed on the drive and guide mechanisms for moving the write spot and the record carrier with respect to each other can be alleviated so that the write and read apparatus can be simple manner and inexpensive.

The user information is written in recording layer portions present on the servo-tracks. In the record carrier according to German Patent Application 3,100,421 the servo-tracks are not continuous tracks but they are interrupted by address and synchronization areas. The address areas indicate the position on the record carrier and the synchronization areas are used to generate a clock signal with which the tangential speed, or the speed in the track direction, of the scanning spot can be controlled. If for the purpose of remaining within the standard established for the CD audio disc the information is to be recorded in the form of an EFM-coded signal, the address and synchronization areas are a handicap because such a signal requires an uninterrupted track.

Particularly for recording an EFM-modulated information signal it has therefore been proposed to use a record carrier in which the servo-tracks are continuous tracks which have a geometrical modulation incorporating the desired control signals. This modulation is, for example, a periodical transversal excursion of the servo-tracks, also referred to as track wobble, which excursion has an amplitude which is considerably smaller than the track width and a frequency which is considerably lower than the frequency of the information signal to be written.

For the record carriers in question it will be an urgent requirement to obtain a maximum possible contrast, which in the case of a reflective record carrier means a maximum possible reflection difference between the servo-tracks and the intermediate lands. A high track contrast is particularly important if a tracking error detection method is to be used which is based on the measurement of intensity difference, such a the convention three-spot tracking method. Also if the possibility of counting tracks is to be used in the case of a fast searching procedure for the written record carrier, in which the radiation spot is moved at great speed in the transversal direction across the record carrier, it is quite desirable for these tracks to have a sufficiently high contrast with the intermediate tracks.

As is known, the servo-tracks may be relatively narrow or relatively wide. Relatively narrow and relatively wide are understood to mean that the width of the servo-tracks is smaller and larger, respectively, than half the transversal track period. When writing an information area in a servo-track with a small radiation spot having a sufficiently high intensity, the optical property of the recording layer in this area is changed in such a way that this area is well distinguished from the rest of the servo-track and can therefore be satisfactorily detected afterwards. It has been found that writing of such an area may detrimentally affect the contrast of the servo-track at the location of this area, dependent on the track width and the type of recording layer.

The optical recording layers may be divided into two types, namely the "white-writing" layers and the "black-writing" layers. A white-writing layer is understood to mean a layer for which the radiation from a written information area has a higher intensity than the radiation from the ambiance of this area. The reverse is true of a black-writing material. In the case of a reflective record carrier with a white-writing recording layer the effective reflection factor of an information area is larger than that of its ambiance, whereas for such a record carrier with a black-writing recording layer the effective reflection factor of the written area is smaller than that of its ambiance.

SUMMARY OF THE INVENTION

An object of the present invention is to provide an inscribable record carrier in which the foregoing problem of a reduced track contrast due to the writing information can no longer occur. The record carrier according to the invention is characterized in that, to increase the contrast between the servo-tracks provided with information areas and the intermediate tracks; one of the following combinations of properties is realized:

a white-writing recording layer and a servo-track width which is larger than half the transversal track period, a black-writing recording layer and a servo-track width which is smaller than half the transversal track period, and in that it comprises an indication about the servo-track width.

This solution to the problem which has now become urgent is based on the recognition that for the conventional size of the radiation spot a narrow servo-track behaves as a diffractive element so that this track effectively has a smaller reflection or transmission coefficient than the contiguous intermediate tracks, whereas a wide servo-track has a larger effective reflection or transmission coefficient than the intermediate tracks. Moreover, due to the intensity distribution within the radiation spot, an information area written in the centre of a servo-track has a great influence on the radiation from the entire track width.

It is to be noted that inscribable record carriers having a narrow or a wide servo-track are known per se, for example, from U.S. Pat. No. 4,363,116 and European Patent Application 0,189,948, respectively. However, neither of these Patent publications states a relationship between the track width and the recording layer being white-writing or black-writing.

U.S. Pat. No. 4,363,116 mentions as possible recording layers for a record carrier having a narrow servo-track both a reflective layer in which small holes having a reduced reflection are melted during writing, hence a black-writing layer, as well as a double layer comprising a first layer of reflective material coated with a second layer which is locally removed during writing and thus exposes the reflective sub-layer, this double layer thus being a white-writing layer.

European Patent Application 0,144,436 describes an inscribable record carrier having either a black or white-writing recording layer which is erasable and reinscribable, or non-erasable and inscribable, respectively. The polarity of the recording layer is laid down in a mark on the record carrier itself outside the annular area in which the information must be written or in the holder for this record carrier. This mark is used to adapt the polarity of the read information signal itself to the recording layer when reading the record carrier or to adapt the polarity of the information signal to be written when writing the information, so that no adaptation is required during reading. The adaptation of the polarity of the signal means that the sign of the pulses of the digital signal changes, or in other words, the pulses are inverted. When writing and reading the record carrier according to the present invention, the polarity of the write or read signal need not be adapted. The track-width information present in the record carrier is used to set reference levels for servo-signals or auxiliary signals in an electronic processing circuit with which the output signals of a radiation-sensitive detection system are processed to information and servo-signals.

European Patent Application 0,144,436 does not state that there should be a given relationship between the polarity of the recording layer and the width of the servo-tracks.

The indication about the servo-track width maybe provided in an optically readable feature located outside the servo-track area.

However, this indication is preferably provided in a lead-in track preceding the servo-track structure.

A preferred illustrative embodiment of this record carrier is further characterized in that the lead-in track comprises a previously recorded standard EFM signal which includes a subcode signal, the indication about the servo-track width being incorporated in the Q-channel of the subcode signal.

The terms EFM signal, subcode signal and Q-channel signal are known from the technology in the field of audio CD record carriers.

The track width information in the lead-in track is recorded in the form of information areas alternating in the track direction with intermediate areas. The information areas have such a small width and the distance between the plane of these areas and the plane of the intermediate tracks is such that, upon scanning with the radiation spot, these areas always supply a satisfactory track-width indication signal whose quality is independent of the width of the subsequent servo-tracks.

According to a second aspect of the invention the apparatus for reading and/or writing the record carrier is characterized in that means are provided for deriving a track width indication signal from the electric signal and setting means setting the signal processing circuit in dependence upon the derived track-width width indication signal.

A preferred illustrative embodiment of this apparatus is further characterized in that the signal processing circuit comprises an EFM subcode demodulator for deriving the Q-channel signal from the electric signal, the arrangement for setting the operation of the signal processing for detecting the unique code in the Q-channel signal comprises a detector the location of the track width indication signal and for separating the track width indication signal from the Q-channel signal in response to the detection of the unique code.

BRIEF DESCRIPTION OF THE DRAWING

The invention will now be described in greater detail, by way of example, with reference to the accompanying drawings in which FIGS. 1a and 1b show an embodiment of an inscribable record carrier in a plan view and in a radial cross-section, FIG. 2 shows in a plan view and on an enlarged scale a part of the lead-in track on this record carrier, FIG. 3 shows this part in a tangential cross-section, FIGS. 4 and 5 show the relationship between the contrast of the servo-tracks and the intermediate tracks on the one hand and the width of these servo-tracks and the type of record carrier on the other hand, FIG. 10 shows an embodiment of an apparatus for writing and reading this record carrier, FIG. 11 shows an embodiment of a signal processing and control circuit of this apparatus, FIG. 12 shows a pattern of information areas written in the record carrier, and FIG. 13 shows the format for the Q-channel signal incorporated in a standard EFM signal.

DETAILED DESCRIPTION OF THE PREFERRED EMBODIMENTS

Figure 6:
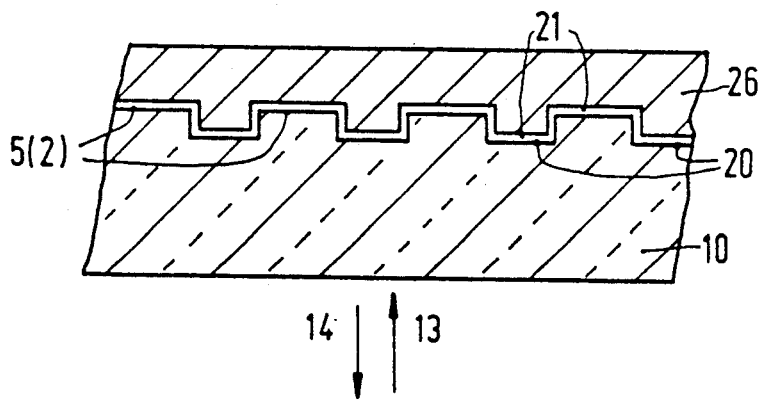
FIGS. 6 to 9 show different embodiments of the record carrier according to the invention.

The round disc-shaped record carrier of FIGS. 1a and 1b includes information surface 2 having a multitude of servo-tracks for example joining one another to form a spiral track. FIG. 1a only shows the centre line 4 of these tracks. For the sake of clarity FIG. 1b only shows a few servo-tracks 3 and intermediate tracks 5. The spiral track is mainly a continuous track and has only a lead-in track section 6 at its start and possibly a lead-out track section 7 at its end. The lead-in track section may be followed by a quantity of previously recorded user information, which is standard information for a large number of users.

Record carrier parameters which are important for writing and reading are stored in the lead-in track section. One of these parameters is the width of the servo-track important for the present invention. In addition, data such as the difference in reflection of the recording layer before and after recording information, the desired writing strategy and the desired writing intensity may be laid down.

As is shown in FIGS 2 and 3, which are a plan view and a tangential cross-section, respectively, of a part of the lead-in track section 6 on an enlarged scale, the lead-in track section comprises a plurality of lead-in information areas 8 alternating in the track direction with intermediate areas 9. A given succession of areas 8 and intermediate areas 9 represents a given combination of digital ones and zeros. The lead-in information areas 8 comprise pits recessed in the surface 2 of the record carrier substrate 10. These pits may have the same depth as the servo-tracks. This depth $d_1$ with respect to the surface 2, represented by the intermediate areas 9 in FIG. 3, is then chosen to be such that the pits can be satisfactorily read by means of the known so-called "Central Aperture" method or integral method on the one hand and that the position of the scanning radiation spot with respect to the centre line 4 of the servo-track can be satisfactorily determined by means of the known so-called "Push-Pull" or differential detection method on the other hand. In the latter method the radiation coming from the record carrier and condensated by an objective system is detected by means of two radiation-sensitive detectors which are located on different sides of a line which is effectively parallel to the track direction. The difference between the output signals of these detectors represents the magnitude and the direction of a deviation between the centre of the radiation spot and the centre line of the servo-track. In the Central Aperture method the radiation coming from the record carrier and condensated by the objective system is received by a central radiation-sensitive detector.

The pits 8 may alternatively have a larger depth than the servo-tracks 3. Then both a maximum Central Aperture signal of these pits and a maximum differential tracking error signal of the servo-tracks can be obtained.

As already noted, the bounding lines of the servo-tracks may have periodical excursions with respect to their centre lines shown in FIG. 1a, the phases of the excursions of the two bounding lines associated with one track being equal. Such tracks are also referred to as wobbling tracks. For a track structure having a transversal track period of 1600 nm the wobble amplitude is, for example, 30 nm so that for a track width $W_1$ of 1200 nm the wobble amplitude is equal to $W_1/40$ and for a track width $W_2$ of 600 nm it is equal to $W_2/20$.

The frequency of the track wobble is of the order of several tens of kHz and is much smaller than the frequency of the information signals to be written, which is of the order of MHz. The wobble frequency may have a fixed component which is used for generating a clock signal with which the writing speed can be controlled. This fixed wobble frequency may a)so be used to make a dynamic signal from the differential tracking error signal. The wobble frequency may be modulated with a digital position information signal so that the position of the radiation spot on the record carrier can be determined when scanning the servo-tracks.

The track wobble is only an example of possible manners of servo-track modulation for storing the said clock and position information. Such a track modulation may also consist of a depth or width modulation of the servo-track. For all possible ways of track modulation it holds that the amplitude of this modulation is small.

To be able to use the servo-tracks with a satisfactory result, these tracks must have a sufficiently high contrast with respect to the intermediate lands. If information areas, diagrammatically shown by means of the reference numeral 15 in FIG. 1a, are recorded in a servo-track, these areas will have a great influence on the intensity of the radiation coming from the record carrier and received by the detector. These information areas will determine the contrast of the servo-track with respect to an intermediate track to a considerable extent. This also applies to a record carrier having a relatively wide track, as shown in FIG. 2, in which the information areas extend across, for example, only a part of the track width. This is a result of the fact that the radiation beams used have a clock-shaped, for example, Gaussian intensity distribution with a maximum intensity on the centre line of the track where the centres of the information areas are also located. For a record carrier in which the servo-tracks have the same width as the lead-in information areas 8 and in which the written information areas 15 have at least the same width, the influence of the information areas on the track contrast is evident.

According to the invention the record carrier is adapted to be such that writing of information areas in a servo-track increases the contrast of this track with respect to the contiguous intermediate ands. This is achieved by providing a white-writing recording layer in the case of wide servo-tracks and a black-writing recording layer in the case of narrow servo-tracks.

The inventive concept will now be described with reference to FIGS. 4 and 5 for a reflective track structure which is exposed through the substrate in conformity with the situation shown in FIG. 3. FIG. 4a is a radial cross-section of a part of a record carrier with narrow servo-tracks in the form of grooves 20 in the substrate 10. The track structure is coated with a reflective recording layer 21. The servo-tracks have, for example, a width $W_1$ of 0.6 $\mu$m and the transversal track period $P_t$ is, for example, 1.6 $\mu$m. When scanning these grooves with a radiation spot whose half-value width is of the order of 1 $\mu$m, which spot is formed by a radiation beam incident on the lower side of the substrate (arrow 13), the radiation is reflected (arrow 14) and diffracted. The half-value width may be defined as the distance between the points in the radiation spot where the intensity is equal to b $1/e^2$ of the maximum intensity, in the centre of a radiation spot. Due to the diffraction less radiation will be received by an objective system which is arranged under the record carrier (see FIG. 10) so that less radiation is incident on a radiation sensitive detection system arranged behind the objective system. If the radiation spot is located on the centre of an intermediate land 5, a maximum quantity of radiation passes through the objective system because then there is hardly any diffraction.

FIG. 4b shows the variation of the intensity $I_{unr}$ of the radiation beam behind the objective system as a function of the radial position r of the radiation spot on the record carrier in accordance with FIG. 4a. In FIG. 4b the reference $C_m$ denotes the minimum desired reflection difference between a groove and an intermediate land.

When writing information areas in the servo-grooves, for example, pits are melted in the recording layer, which pits have a reflection-reducing and dispersing effect. The information areas may also be written in so-called phase change materials which change their reflection under the influence of incident radiation. After writing information areas in the servo-tracks and upon re-scanning these tracks, the intensity of the beam from the servo-tracks is reduced, as is evident from a comparison of FIGS. 4c and 4b.

FIG. 4c relates to a black-writing recording layer. If a white-writing recording layer were provided on the track structure of FIG. 4a, the reflection would be locally increased by writing information areas, as is shown in FIG. 4d. Then the situation may occur that the difference in reflection between the written servo-tracks and the intermediate lands becomes smaller than the minimum desired difference $C_m$. In extreme cases the reflection of a written servo-track may even be larger than that of an intermediate land.

It follows from the above that a black-writing recording layer must be used for narrow servo-tracks.

Besides the reflective layer in which pits are melted, black-writing recording layers may alternatively be layers of alloy materials which can melt together upon laser light radiation and then exhibit a reduced reflection or transmission coefficient, and layers of so-called phase change materials which change from the crystalline to the amorphous state under the influence of incident radiation, or conversely, which change is accompanied by a change of the reflection or transmission coefficient. An example of a black-writing phase change material is gallium antimonide.

There are also white-writing phase change materials such as indium antimonide. Other examples of white-writing recording layers are a double layer comprising a sub-layer of reflective material and an upper layer which, when melted away, increases the reflection of the double layer, or layers of alloy materials whose reflection or transmission coefficient is increased when they melt together.

FIG. 5a shows a reflective track structure with wide servo-grooves 23. The width $W_1$ of these grooves is, for example, 1.1 μm and the track period $P_t$ is, for example, 1.6 μm. These grooves behave for a radiation spot with a half-value width of the order of 1 μm as mirror portions reflecting the radiation substantially without diffraction. However, if the centre of the radiation spot is located on the centre line of a narrow intermediate land 5, the radiation is largely diffracted.

FIG. 5b shows the variation of the radiation intensity incident on the radiation-sensitive detection system as a function of the radial position of the radiation spot.

FIG. 5c shows how the intensity of the radiation from the grooves is reduced if an information area 25 is written in a black-writing recording layer 24. The contrast difference between the servo-tracks and the intermediate tracks can now become smaller than the minimum desired value $C_m$.

If the recording layer 24 is a white-writing layer, the writing of information areas in the servo-tracks increases the reflection difference between these tracks and the intermediate tracks so that this difference amply exceeds the value $C_m$.

It then becomes apparent that a white-writing recording layer must be used if the servo-tracks are wide tracks.

FIGS. 6 to 9 show different embodiments of a reflective record carrier according to the invention. The record carriers according to FIGS. 6 and 7 have a transparent substrate 10 and are written and read through this substrate, as is indicated by the arrows 13 and 14 at the bottom of these Figures. In the record carrier according to FIG. 6 the servo-tracks are narrow grooves 20 and the recording layer is a black-writing layer 21. Instead of being formed by grooves the servo-tracks in this record carrier may alternatively be formed by ridges on the information surface 2. In the record carrier according to FIG. 7 the servo-tracks are wide grooves 23 and the recording layer is a white-writing layer 24. Also in this record carrier the servo-tracks may be formed by wide ridges on the information surface 2 instead of by grooves. A protective layer 26 which need not be transparent and need not have a good optical quality may be provided on the recording layers 21 and 24.

Figure 7:
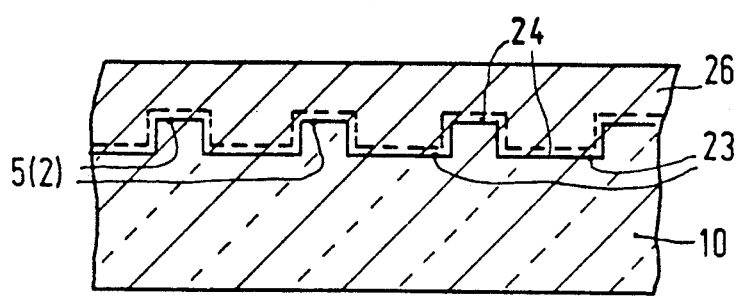

If the recording layers 21 and 24 in the record carriers according to FIGS. 6 and 7 are transmission layers instead of reflective layers, these record carriers may be read in transmission. The protective layer 26 must then have a good optical quality.

Figure 8:
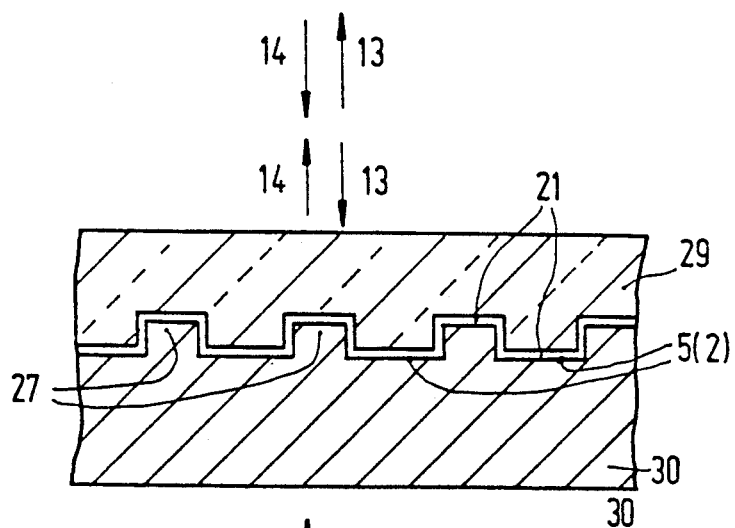
Figure 9:
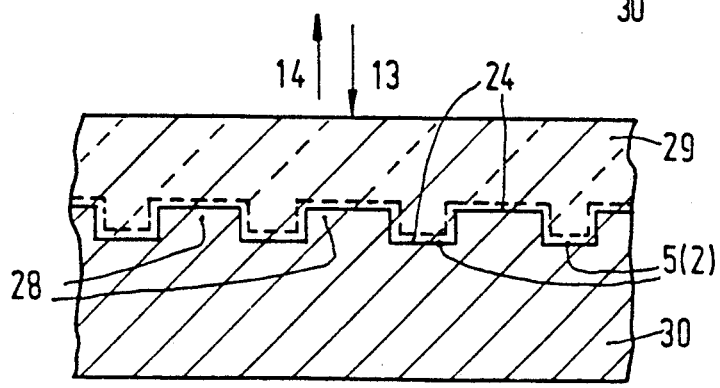

Such a good quality is also required for the protective layer 29 of the record carriers according to FIGS. 8 and 9 which are written and read by radiation which is incident from the top, and which does not pass through the substrate 30. This substrate may then be opaque. In the record carrier according to FIG. 8 the servo-tracks consist of narrow ridges 27 on the information surface 2 and the recording layer is a black-writing layer 21. In the record carrier according to FIG. 9 the servo-tracks consist of wide ridges 28 on the information surface 2 and the recording layer is a white-writing layer 24. The narrow and wide ridges 27 and 28 may also be replaced by narrow and wide grooves in the information surface.

As is known, record carriers which are written and read through the substrate are preferred to record carriers for which this is not the case.

FIG. 10 shows diagrammatically an illustrative embodiment of an apparatus for writing and reading a record carrier according to the invention. The record carrier 1 with the information surface 2 provided with servo-tracks 3 and the recording layer 21 on this surface is shown in a radial cross-section. This record carrier is scanned by a beam b emitted by a radiation source 40, preferably a semiconductor diode laser such as an AlGaAs laser. The beam b is focused on the information surface 2 by means of an objective system 44. In the radiation path there is arranged a collimator lens 42 converting the diverging beam emitted by the diode laser into a parallel beam having such a crosssection that the pupil of the objective system is well filled so that a diffraction-limited radiation spot V with a minimum sire is formed on the information surface 2. The height of the apparatus can be limited by arranging a mirror 43 between the collimator lens and the objective system, which mirror reflects the beam at an angle of 90°.

During writing of the information the intensity of the beam is switched between a high (write) level realizing an optically detectable change in the recording layer and a low (read) level at which such a change does not occur. The intensity modulation of the beam is preferably realized by modulating the electric current through the diode laser by means of a control circuit 50 to which the information signal $S_i$ to be written is applied.

During the writing procedure it can be ascertained by means of the radiation reflected by the recording layer whether the centre of the radiation spot deviates from the centre line of the servo-track portion to be written. This reflected radiation traverses the objective system 44 and the collimator lens 42 and at least a part of this radiation is reflected to a radiation-sensitive detection system 46 by a beam-separating element 41, for example, a semi-transparent mirror. This system comprises two detectors 47 and 48 which are separated from each other by a narrow strip which is effectively parallel to the track direction. The output signals of the detectors 47 and 48 are applied to a signal processing and control circuit 50 in which a tracking error signal $S_r$ comprising information about the magnitude and direction of a deviation between the centre of the radiation spot V and the centre line of a scanned track portion 3 is derived from the difference between the detector signals. This tracking error signal is applied to a control member 52 with which the position of the radiation spot can be corrected.

This control may consist of tilting the reflector 43 through small angles about the axis 51, which tilting moves the radiation spot V in the radial direction. The radial or transversal control signal may be split up into a fine-control component with which an accurate control can be realized within a limited control range, for example, by tilting the reflector 43, and a coarse-control component with which a coarser control can be realized over a larger range. The coarse control may be realized by moving a holder 53 which holder only accommodates the reflector and the objective system, or a holder accommodating all optical components of the apparatus, in the radial direction.

For reading the information written in the record carrier also the apparatus according to FIG. 10 is used the radiation beam b having now a constant intensity. Then the sum of the signals of the detectors 47 and 48 is determined and further processed in the signal processing circuit The output signal $S_o$ of the circuit 50 represents the information read from the record carrier.

FIG. 11 depicts an illustrative embodiment of the signal processing circuit 50 comprising an encoding circuit, for example, an EFM modulator 60 of a conventional type with which an information signal $S_i$ to be recorded can be converted into an EFM-modulated signal.

The EFM-modulated signal at the output of the EFM modulator 60 is applied to a circuit 61 which converts the EFM-modulated signal into a series of control pulses for the laser 40 as described in detail, for example, in U.S. Pat. No. 4,473,829. The output signal of the circuit 61 can be applied to the laser 40 via a multiplex circuit 63 controlled by a programmable control unit 62. In response to the control pulses the laser 40 generates radiation pulses having an intensity which is sufficient to realize an optically detectable change in the portion of the track 3 irradiated by radiation beam b, so that a pattern of information areas is provided in the track 3 representing the signal $S_i$ to be recorded.

FIG. 12 shows an example of a pattern of information areas 15 provided in a track portion 3 in the manner described hereinbefore.

If the information thus recorded in the track portion 3 must be read again, the pattern of information areas 15 is scanned by the radiation beam b, whilst the intensity of the radiation beam b is set to a level which is too low to bring about an optically detectable change. The low intensity of the radiation beam b may be set by bringing the multiplex circuit 63 by means of the control unit 62 to a state in which a control signal I1 at one of the inputs of the multiplex circuit 63 is applied to the laser 40. When scanning the pattern of information areas 15, the intensity of the reflected radiation beam b is modulated in conformity with the pattern.

The signal component representing the intensity modulation brought about by the pattern of information areas is separated by means of a high-pass filter 64 from the sum signal 49 of the detectors 47 and 48, which signal is proportional to the intensity of the reflected radiation beam. This signal component is applied to an EFM demodulator 66 of a conventional type, which converts the signal into an information signal So. The EFM demodulator 66 comprises a subcode demodulator 73 for recovering the Q-channel signal which is incorporated in the EFM signal. The Q-channel signal is applied via a signal line 72 to the control unit 62 which controls the reading operation in a conventional manner by means of the applied Q-channel signal.

The record carrier according to the invention incorporates an indication about the width of the servo-tracks, which indication is read by the apparatus according to FIGS. 10 and 11 and is used to set various controls dependent on whether wide or narrow servo-tracks are present in the record carrier.

If record carriers are used for recording EFM signals, it is preferable to incorporate this indication in a Table of contents (TOC) recorded in the lead-in track.

The lead-in track, which is constituted by a section of the track structure not intended for recording, is denoted by the reference numeral 6 in FIG. 1. FIG. 2 shows a part of the lead-in track 6 on an exaggerated scale comprising a pattern of areas which have been recorded in advance. FIG. 3 is a tangential cross-section of this part.

The so-called Q-channel is eminently suitable for recording the track-width indication. This Q-channel comprises 98 bits which are recorded in each EFM subcode frame together with the other information.

FIG. 13 shows the format of the 98 Q-channel bits associated with a subcode frame. The 98 bits are spread over a group 80 of 2 bits, two groups 81, 82 of 4 bits, two groups 83 and 84 of 8 bits, groups 85 of 56 bits and one group 86 of 16 bits. The bits of group 80 are used for synchronization. The bits of group 81 are used as control bits. In the lead-in track 6 the 12 bits of groups 82 and 83 constitute a code "100" (hexadecimal) indicating that the relevant track portion forms part of the lead-in track 6.

The type of information stored in group 85 is characterized by means of 8 bits of group 84. The 16 bits of group 86 are used for error detection.

A unique bit combination, for example, FF (hexadecimal) can indicate that the bits in group 85 represent information about the parameters of the record carrier. A number of these bits, for example, those of sub-group 85a may be used to indicate the track width. The other bits of group 85 may be used to indicate other parameters, for example, the desired write intensity and the desired write strategy.

The indication about the servo-track width may simply be recovered when scanning the lead-in track 6 from the Q-channel bits which are applied via the signal line 72 to the programmable control unit 62. This information is used to set various auxiliary control circuits in the write-read apparatus in dependence upon the servo-track width.

This apparatus may comprise additional conventional detailed apparatus not shown in FIGS. 10 and 11, such additional apparatus may provide the correction of offsets in the tracking error signal;

detecting whether the radiation spot moves alongside the servo-track, track, hence whether there is track loss;

detecting signal loss due to irregularities in the information surface ("drop-outs").

An offset of the tracking error signal, $S_r$ in FIG. 10, is understood to mean that this signal indicates that the radiation spot V is not centred on the servo-track to be scanned, whereas this is actually the case, or conversely. Such an offset may be caused, for example, by an asymmetry in the intensity distribution of the scanning beam or by an oblique position of the record carrier. As described, for example, in U.S. Pat. No. 4,471,477 a signal which is indicative of this offset can be obtained by wobbling the radiation spot and the track with respect to each other in a transversal direction upon scanning a track, so that the detector signal acquires a wobble component. By comparison of the phase and the frequency of this component with that of the movement of the radiation spot and the track with respect to each other, the desired offset signal can be obtained, with which signal the tracking error signal can be corrected. The offset signal has a different polarity for a wide track as compared with the polarity for a narrow track. With the indication about the track width obtained from the lead-in track 6 it can be ensured in the signal processing and control circuit that the offset signal is combined to the tracking error signal always with the same polarity.

For the track loss detection and the signal loss or dropout detection reference may be made, for example, to European Patent Application no. 0,138,273. Reference levels for the signals are used for these detections, which levels are different for a wide servo-track than for a narrow servo-track. In the signal processing and control circuit the track-width information read from the lead-in track 6 is used to realize a desired adaptation of the said reference levels to the track width.

What is claimed is:

1. Apparatus for reading and/or writing information in a pattern of optically detectable information areas in a record carrier, the apparatus comprising scanning means for scanning a track using a radiation beam, opto-electrical conversion means for converting radiation from the track into an electrical signal, a signal processing circuit for deriving an information signal from the electric signal indicative of the information recorded in the scanned track, means for deriving a track-width signal from the electric signal, and means for setting the signal processing circuit in response to the derived track-width indication signal.

2. Apparatus as claimed in claim 1, characterized in that the signal processing circuit comprises an EFM subcode demodulator for deriving the Q-channel signal from the electric signal, and the means for setting comprises means for detecting occurrence of a unique code in a Q-channel signal indicative of the location of the track-width signal and for separating the track-width signal from the Q-channel signal in response to the detection of the unique code.

3. Apparatus for reading and/or writing information in a pattern of optically detectable information areas in a record carrier, said record carrier comprising a substrate having an information surface including a structure of servo-tracks in which information is to be recorded and which alternate, in a transversal direction relative to a track direction, with intermediate lands located in an information plane and forming intermediate tracks, the servo-tracks being located in a second plane, the structure of the servo-tracks having a given transversal track period and being provided with an inscribable recording layer for writing optically detectable information areas in the servo-tracks, said record carrier further comprising one of the following combinations to increase the contrast between the servo-tracks provided with information areas and the intermediate tracks, a first recording layer responsive to writing by increasing its reflectivity relative to that of unwritten portions of the first recording layer and a first servo-track width which exceeds that of the transversal track period, a second recording layer responsive to writing by decreasing its reflectivity relative to that of the unwritten portions of the second recording layer and a second servo-track width which is less than half of the transversal track period, and means for identifying presence of the first or the second servo-track width, the apparatus comprising scanning means for scanning a track by means of a radiation beam, opto-electrical conversion means for converting radiation from the track into an electric signal, a signal processor for deriving from the electric signal an information signal representing the information recorded in the scanned track, means for deriving a track-width indication signal from the electric signal, and setting means for setting the signal processor in accordance with the derived track-width indication signal.

4. Apparatus as claimed in claim 3, wherein the signal processor comprises an EFM subcode demodulator for deriving the Q-channel signal from the electric signal, and the setting means comprises detection means for detecting the unique code in the Q-channel signal indicating the location of the track-width indication signal and for separating the track-width indication signal from the Q-channel signal in response to the detection of the unique code.

* * * * *

UNITED STATES PATENT AND TRADEMARK OFFICE
CERTIFICATE OF CORRECTION

PATENT NO. : 5,025,435

DATED : June 18, 1991

INVENTOR(S) : AARTJE W. VEENIS ET AL

It is certified that error appears in the above-identified patent and that said Letters Patent is hereby corrected as shown below:

| | | |
|---|---|---|
| Col. 1 | line 38 | change "Which" to --which--; |
| | line 65 | before "simple" insert --made in a--; |
| Col 2 | lines 31-32 | change "a the convention" to --as the conventional--; |
| | line 58 (8th line from bottom) | change "ambiance of this" to --surrounding--; |
| | line 62 | change "ambiance" to --surrounding area--; |
| | line 65 (last line) | change "ambiance" to --surrounding area--; |
| Col. 5 | line 46 | change "condensated" to --condensed--; |
| | line 55 | change "condensated" to --condensed--; |
| Col. 6 | line 10 | change "a)so" to --also--; |
| | line 36 | change "clock-shaped" to --bell-shaped--; |
| | line 48 | change "ands" to --lands--. |
| | line 68 | after "equal to" delete "b"; |
| Col. 7 | line 24 | change ":e-scanning" to --re-scanning--; |
| Col. 8 | line 34 | change "he" to --be--; |
| Col. 9 | line 5 | change "sire" to --size--. |

UNITED STATES PATENT AND TRADEMARK OFFICE
CERTIFICATE OF CORRECTION

PATENT NO. : 5,025,435

DATED : June 18, 1991

INVENTOR(S) : Aartje W. Veenis et al

It is certified that error appears in the above-identified patent and that said Letters Patent is hereby corrected as shown below:

Claim 3  line 21 (col. 12, line 36)

change "that" to --half--.

Signed and Sealed this

Twenty-fifth Day of May, 1993

Attest:

MICHAEL K. KIRK

*Attesting Officer*      *Acting Commissioner of Patents and Trademarks*